INVENTORS
B. A. LOVELL
J. W. McGRATH

By A J Nugent
ATTORNEY

March 29, 1966  B. A. LOVELL ETAL  3,243,696
APPARATUS FOR ADJUSTING RELAYS TO OPERATE AND RELEASE AT
DESIRED VALUES OF CURRENT
Filed July 31, 1961  2 Sheets-Sheet 2

INVENTORS
B. A. LOVELL
J. W. McGRATH

BY A. J. Nugent

ATTORNEY

United States Patent Office 3,243,696
Patented Mar. 29, 1966

1

3,243,696
APPARATUS FOR ADJUSTING RELAYS TO OPERATE AND RELEASE AT DESIRED VALUES OF CURRENT
Bruce A. Lovell, Endicott, N.Y., and John W. McGrath, Allentown, Pa., assignors to Western Electric Company, Incorporated, a corporation of New York
Filed July 31, 1961, Ser. No. 127,942
4 Claims. (Cl. 324—28)

This invention relates to apparatus for adjusting relays, and particularly for adjusting relays to operate and release at desired values of current.

The Western Electric 291-type mercury relay includes a magnetizable switch enclosed in a glass tube having a pool of mercury at its lower end, and an energizing coil about the glass tube, and a pair of permanent magnets on opposite sides of the switch for controlling the operation and release of the relays. The assemblage is mounted within a steel case. The adjustment of the relay embraces overmagnetizing both magnets through the steel case with respect to the ultimate magnetic adjustment and then demagnetiziging each as required to give the desired operate and release adjustments of the relay. This technique applied to a single magnet is disclosed in U.S. Patent 2,577,602, to E. T. Burton.

The adjustments were made by applying pulses to a pair of coils mounted on opposite sides of an adjusting yoke which straddles the steel case of the relay under test. First, both magnetic were overmagnetized by applying pulses to the coils. A gradually increasing demagnetizing current in the form of pulses was applied to one coil on the yoke, i.e., the one most effectual in determining the release point of the relay. The demagnetizing current was increased in step until a preliminary release adjustment was reached. In like manner, pulses were subsequently applied to the opposite yoke coil until a preliminary operate adjustment was reached. It was found that, except in rare instances, the release magnet was out of adjustment after the preliminary adjustments had been made and further demagnetiziging steps were required until a satisfactory adjustment of both magnets was achieved.

In the adjusting test set previously used for each demagnetizing step, the current was increased by a fixed amount or quanta. After each step the relay was tested and if it was not in adjustment, another step was made. If the adjustment steps were made in small terms of increased current, reaching the final adjustment became time consuming. If the adjusting steps were made large, the operator might overshoot the desired adjustment and find it necessary to repeat the entire testing procedure. Obviously, prior art techniques, as exemplified by the one just described, required cumbersome and time-consuming operations in the adjustment of the relays. While the present invention is being described in terms of a particular mercury relay, it goes without saying that it may find application to a wide variety of other relays.

An object of the invention is to simplify and to improve the adjustment of the operate and release sensitivity of relays.

Another object of the invention is to adjust relays having permanent biasing magnets for controlling the operation and release of the relays.

Other objects, features and advantages of the invention will become obvious from the ensuing description.

In accordance with a preferred embodiment of the invention, circuit means generates two dot-like markers on an oscilloscope screen, respectively representative of

2 the desired operate and release current conditions. The relay being tested is operated and released by passing a current through the relay coil. The current is depicted on the oscilloscope screen as a straight line. As the relay is demagnetized in steps, the line is eventually moved just between the dot-like markers indicating that the relay switch is being operated under the desired operate and current conditions. By use of the novel apparatus, the adjustment of the relay can be accomplished in a simple, rapid and precise manner.

The invention will be more fully understood from the following detailed description when read in conjunction with the drawings, wherein.

Figure 1:
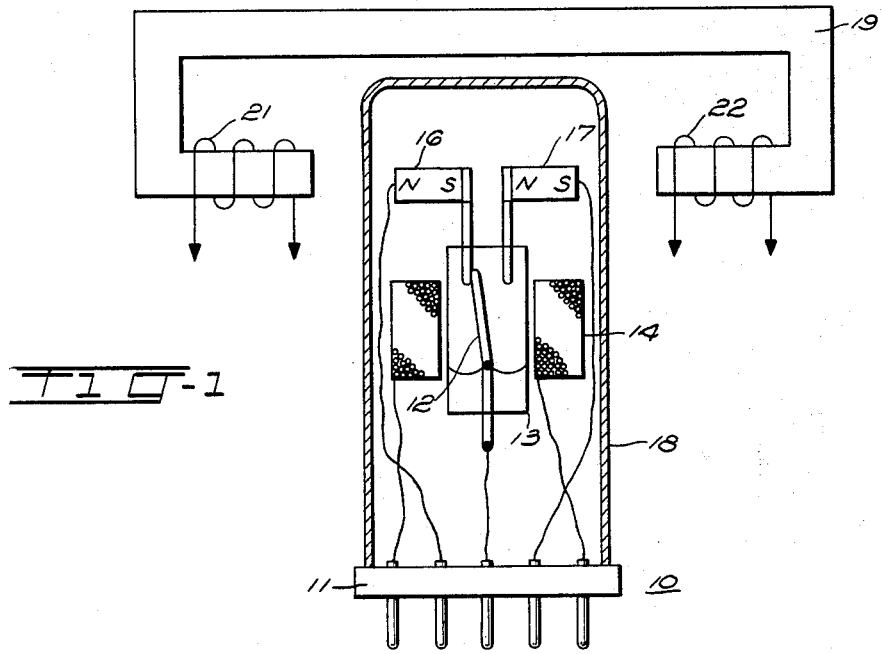
FIG. 1 shows in schematic form an adjusting arrangement for magnetizing and demagnetizing a relay under test.

FIG. 1 shows a mercury relay 10 which includes a base 11, a magnetizable switch or armature 12 enclosed in a glass envelope 13, a relay coil 14, permanent magnets 16 and 17, respectively, for controlling the release and operate sensitivity of the relay, and a steel case 18 for protecting the relay. Outside the steel case of the relay is shown an adjusting yoke 19 on which is mounted at one side a coil 21 for primarily controlling the magnetization and demagnetization of magnet 16, and at the opposite side a coil 22 primarily for controlling the magnetization and demagnetization of magnet 17. For purposes of illustration, the relay is of the unidirectional type which operates and releases at different amplitudes of current.

Figure 2:
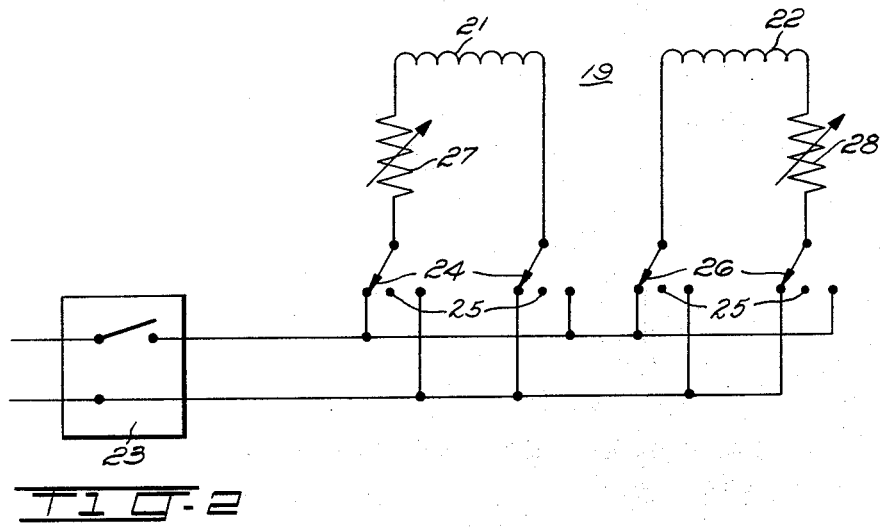
FIG. 2 is a circuit which includes coils of the adjusting yoke.

FIG. 2 shows a circuit diagram for magnetizing and demagnetizing the magnets. The circuit includes a pulser 23 which provides, for instance, a half-wave pulse four times per second. When the magnets are to be magnetized, contacts of switches 24 and and 26 are moved to the left-hand position in FIG. 2 and the variable resistors 27 and 28 are placed in a high current or low resistance position. Pulses received from the pulser 23 result in magnetic fields which charge the magnets to an overmagnetized condition. When the demagnetizing pulses are applied respectively to the coils 21 and 22, this is done on an individual basis. In other words, when the release coil 21 is to be pulsed, its switch 24 is moved to the extreme right-hand position to reverse the current through the coil, while switch 26 for the operate coil 22 is placed in the middle or dead-contact position 25. Conversely, when coil 22 is to be pulsed, switch 26 is moved to the right-hand position and switch 24 is placed in the middle position.

Figure 3:
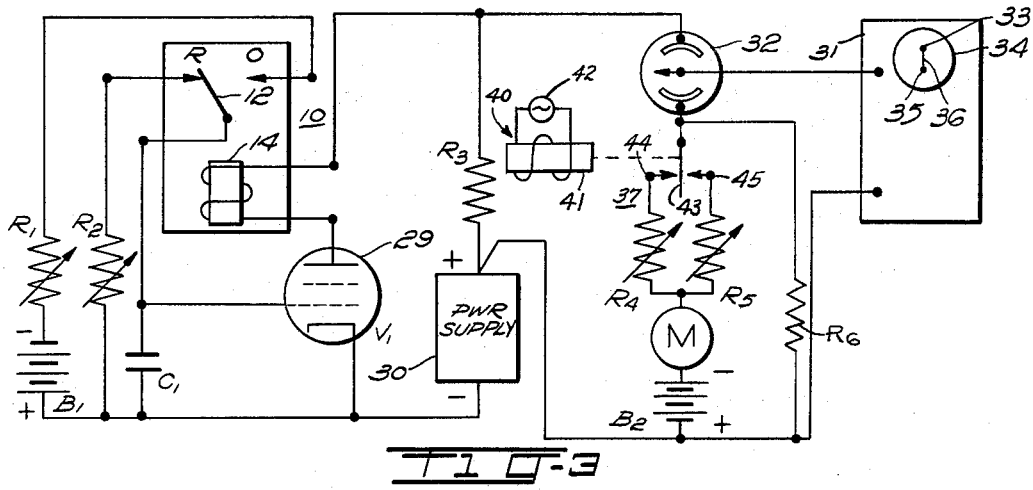
FIG. 3 is a circuit including the relay under test and the oscilloscope.

FIG. 3 shows a relay cycling circuit wherein current for the relay coil 14 is provided by the plate circuit of tube 29 connected to power supply 30. With switch 12 in the release position, the time constant circuit provided by resistor $R_2$ and capacitor $C_1$ which controls the input of tube 29 determines the operate point of relay 10, while the charge time in the operate position is determined by the time constant of resistor $R_1$ and capacitor $C_1$. As the relay cycles back and forth, current flows in resistor $R_3$ and a predetermined voltage appears across that resistor. When the power is turned on, switch 12 moves to the right since the tube is at that time placed in its high current condition with zero bias. As the capacitor $C_1$ charges, the grid becomes more negative reducing the current in the tube until a point is reached at which the relay releases and switch 12 moves back to the left. As the capacitor discharges, the grid becomes less negative and the plate current increases until the relay operates, the switch 12 moving to the right.

The input of the oscilloscope 31 is controlled by a rotary switch 32. Only the vertical deflecting system of the oscilloscope is used. While a rotary switch 32 and a control 37 have been shown, this is purely for the purpose of simplifying an explanation of the invention, it being understood that other circuits such as relay circuits having suitable timing arrangements would preferably be used. The variable resistor $R_4$ is adjusted in accordance with the desired operate point of the relay and the position of variable resistor $R_5$ is adjusted in accordance with the desired release point of the relay. The voltages appearing across $R_6$, which has a resistance value equal to the value of resistance $R_3$, is applied to the oscilloscope. These voltages, of course, are representative of the desired operate and release currents. The rise and fall currents through relay winding 14 on operation and release of the relay provide a voltage across $R_3$, as pointed out above. Thus, as the contact of rotary switch 32 rotates, it senses or samples the operate and release voltage markers provided respectively by resistors $R_4$ and $R_5$ and the voltage across resistor $R_3$ representative of the current in winding 14 of relay 10. Dot or marker 33 on the oscilloscope screen 34 represents the desired operate point of the relay; dot 35 represents the desired release point, and vertical trace 36 represents the current in the relay winding 14 as the relay is cycled as described. Control 37 is shown for alternately connecting variable resistors $R_4$ and $R_5$ providing respectively the desired operate and release currents. The control circuit 37 is seen to include a polar relay 40 having a coil 41 supplied with current from an alternating source 42. By reason of this arrangement, a switch 43 is continuously driven between the contacts 44 and 45 to provide the square wave shown in FIG. 4.

Figure 4:
FIG. 4 shows the various wave forms used in the test.

The actual wave forms applied to the oscilloscope are shown in FIG. 4. At the left, the wave form, which is of square wave configuration, provides the operate and release dots or markers. The central portion of the figure shows a saw-tooth type of wave which represents the rise and fall of current in the relay as it is cycled, while at the right, the wave form shows the combination of the square wave and the saw-tooth wave.

Figure 5:
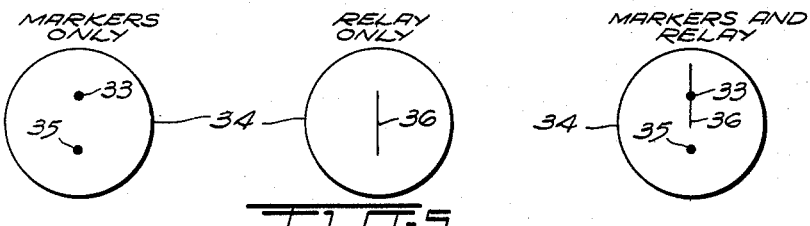
FIG. 5 is a schematic indication of the oscilloscope trace.

In FIG. 5, at the left, the oscilloscope screen is shown with the operate and release dots only, at the center, the relay current only, and at the right a combination of both.

Figure 6:
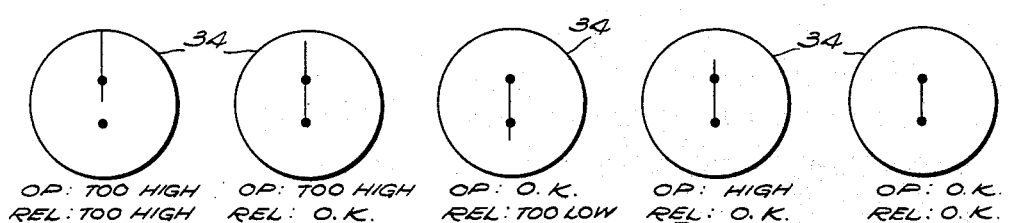
FIG. 6 is a schematic indication of the various oscilloscope traces found in a typical adjustment.

FIG. 6 shows the oscilloscope screen during a typical relay adjustment. During adjustment, with switch 24 moved to the right, variable resistor 27 is adjusted in steps of increasing current until the release point is established. Switch 24 is deactivated and then switch 26 is activated by movement to the right in demagnetizing position and variable resistor 28 is manipulated in steps, as explained in connection with variable resistor 27. Since the operator can see the adjustment results immediately on the screen, by a relatively few adjustments she can quickly demagnetize the magnets 16 and 17 to the proper value. The desired final condition is immediately apparent when the trace of the relay current just extends between the operating and release markers.

The speed of operation of the control 32 is, of course, selected with respect to the frequency of the square wave and saw tooth wave to produce the patterns shown in FIGS. 4 and 5 wherein the individual samples comprise several cycles of each wave form. Oscilloscopes, of course, depend upon persistency of vision to create the illusion of a relatively fixed pattern.

Various changes may be made without departing from the essence of the present invention.

What is claimed is:

1. Apparatus for adjusting a relay having an energizing winding, a switch, and a pair of magnets for biasing said switch, one magnet for primarily controlling the release sensitivity of the relay, and one magnet for primarily controlling the operate sensitivity of the relay, comprising:

an adjusting yoke,
a first coil mounted on the yoke for primarily controlling the magnetization of one magnet,
a second coil mounted on the yoke for primarily controlling the magnetization of the other magnet,
pulsing means for applying pulses of one polarity to the coils for overmagnetizing the magnets with respect to the ultimate magnetic adjustment and for thereafter applying reverse pulses to the coils for demagnetizing the magnets,
a circuit for continuously cycling the relay between its release and operate conditions to generate a continuously varying voltage representing the varying current conditions of the relay,
an oscilloscope having a single operating deflection system,
circuit means for continuously generating a pair of voltages of differing magnitude representing respectively the desired operate and release currents of the relay,
means for continuously and alternating applying samples of the pair of voltages and the continuously varying voltage to the single deflecting system to provide respectively two spaced dot-like markers on the oscilloscope screen and a linear trace extending in a plane common to the dot-like markers, and
means for adjusting the pulsing means to control the demagnetizing pulses until the linear trace just extends from one dot-like marker to the other dot-like marker.

2. Apparatus according to claim 1 wherein the cycling circuit comprises:

a resistor connectible to the release contact of the relay under test,
a resistor connectible to the operate contact of the relay,
a capacitor connectible to the relay switch,
an amplifier having its plate circuit connectible through the relay winding, the resistors and capacitor controlling the input of the amplifier, and
a resistor connected to the output of the amplifier.

3. Apparatus according to claim 1 wherein the circuit means comprises:

first variable resistor means for establishing the desired operate current of the relay and
second variable resistor means for establishing the desired release current of the relay.

4. Apparatus for adjusting a relay to operate between two current conditions wherein the relay includes magnetic biasing means for biasing the raley switch comprising:

circut means for generating a current of a substantially square wave configuration whose opposite peak conditions represent the two desired final operating current conditions,
circuit means for cycling a relay to be adjusted continuously between release and operate current conditions by passing a cyclically varying current through the relay coil,
an oscilloscope having a single operating deflection system,
switching means for alternately applying to the single deflection system samples of voltages representing respectively the square wave current conditions and the cyclically varying current through the relay coil, the square wave current providing two space dot-like markers on the oscilloscope screen and the cyclically varying relay current providing a substantially linear trace on the screen, a pulsing circuit, and circuit means for operating the pulsing circuit to apply pulses of one polarity to the magnetic biasing means to overmagnetize the magnetic biasing means with respect to the ultimate magnetic adjustment and for applying pulses of opposite polarity to the magnetic biasing means in one or more steps until the trace just extends between the markers.

References Cited by the Examiner

UNITED STATES PATENTS

| | | | |
|---|---|---|---|
| 2,805,388 | 9/1957 | Brown | 324—28 |
| 2,806,186 | 9/1957 | Brown | 324—28 |

WALTER L. CARLSON, *Primary Examiner.*

G. L. LETT, *Assistant Examiner.*